Patented Mar. 24, 1936

2,035,292

UNITED STATES PATENT OFFICE 2,035,292

MANUFACTURE OF PARA AMINO PHENOL

Johann A. Bertsch, St. Louis, Mo., assignor to Monsanto Chemical Company, St. Louis, Mo., a corporation of Delaware No Drawing. Application December 11, 1933, Serial No. 701,873

3 Claims. (Cl. 260—130.5)

This invention relates to the manufacture of para amino phenol and it has particular application to a method wherein para nitro phenol is reduced by elemental hydrogen to the corresponding amino compound.

The invention has as its object the provision of a method as above identified wherein a practically quantitative yield of para amino phenol is obtainable directly which is of excellent quality and suitable for use in the manufacture of various dyes and photographic chemicals.

Although the reduction of para nitro phenol to the corresponding amino compound has been proposed heretofore, the process is rendered difficult due in part to the fact that para amino phenol is sensitive to a large variety of reagents, particularly air and similar oxidizing agents, which results in decomposition accompanied by discoloration of the product.

I have now found that a para amino phenol of excellent quality can be produced in substantially quantitative yields by the reduction of the nitro compound, by effecting the reaction in the presence of an inert solvent medium, as, for example, alcohol, which under the conditions of the reaction functions as a solvent from which the desired product may be obtained by cooling. The crystalline product so produced is separated from the mother liquor as by filtration and dried while avoiding contact with air. The mother liquor contains a substantial amount of the product in solution which may be recovered by concentration and crystallization. However, the product so obtained is of inferior quality and unsuited for most purposes due apparently to the presence of oxidation and intermediate products. I have found, however, that this second crop of crystals from the mother liquor may be returned to the next hydrogenation cycle whereby the discoloration is largely eliminated and one can obtain a marketable product upon cooling the solution. Thus, amino phenol contained in the mother liquor from the first crystallization may be combined with additional para nitro phenol and the resulting mixture subjected to reduction. The reduced product is recovered in the same manner as in the first cycle of operation. By proceeding in this manner one obtains practically quantitative yields of para amino phenol of good quality without at the same time producing a quantity of para amino phenol which is of inferior quality.

The para amino phenol must be dissolved in a suitable inert solvent. For this purpose ethyl alcohol will be found satisfactory although other organic solvents may be employed, care being exercised to avoid the use of solvents which are known to contain impurities having a poisoning action on the hydrogenation catalyst. A hydrocarbon such as benzol may be employed provided it is free from sulphur impurities. In general, the hydrocarbons are not as well adapted for the process as alcohol due to the restricted solubility. Methanol may be employed; likewise propanol will be found suitable.

I have also found that it is desirable to eliminate the water formed by the reaction, from the mother liquor and before the para amino phenol which it contains is subjected again to reduction. To this end it is convenient to employ a solvent from which the water distills leaving an anhydrous solvent together with the amino phenol in the still. Such alcohols include normal butanol and higher alcohols.

The catalyst employed in the hydrogenation may be any of the well known hydrogenation or reduction catalysts, particularly those of the nickel type. The nature and method of preparing these catalysts is well understood by those skilled in this art. In general, it is preferable to employ a catalyst which is finely divided yet separable by filtration, and which may be maintained in suspension by the ordinary autoclave agitating devices.

A better understanding of my invention may be had from the following specific example of one embodiment thereof:

3000 parts of ethyl alcohol containing approximately 150 parts of unrefined para amino phenol in solution as from a previous run, is charged into an autoclave together with 360 parts of para nitro phenol and 3 to 5 parts of finely divided nickel catalyst, such as is available on the market or which may be prepared by any of the well known methods. After displacing the air in the autoclave with hydrogen the autoclave is heated to approximately 70° C. and a hydrogen pressure of 200 to 300 pounds is applied under thoroughly agitated conditions. The temperature and pressure are gradually raised to 115°–125° C. until it is evident that no more hydrogen is absorbed at 600 pounds pressure. In the early stages of the reaction the hydrogen is readily absorbed but as the reaction proceeds to completion the rate diminishes and the elevated pressure and temperature conditions are desirable to insure completion of the reduction.

The autoclave is then permitted to cool to approximately 80° C. after which the contents are discharged through a cloth filter which may previously have been coated with a filter aid such as Filtercel whereby the suspended material, consisting essentially of the nickel catalyst, is removed. The filtrate may be diluted with additional alcohol to facilitate the filtration while maintaining a temperature of 78°–80° C. after which it is permitted to cool whereby a crop of crystals is obtained which is separated from the liquid fraction while avoiding, carefully, contact with air. The crystalline product so obtained is dried by means of an inert gas such as nitrogen or carbon dioxide. After the crystals are perfectly dry there is practically no danger of decomposition. They will be found to retain a substantially colorless or slightly gray or rose appearance. The mother liquor is again charged into the autoclave, preferably after treatment with 2.5 parts of bonechar or "Darco" (a decolorizing carbon obtained by carbonization of lignite). Since the presence of water tends to impede the reduction and induce side reactions it is desirable to remove the water that is produced during the reduction and which is present in the filtrate. To this end the filtrate may be evaporated to dryness and the distillate after suitable treatment to dry the same is returned to the autoclave along with the amino compound. The use of a solvent from which water can be separated in the initial stages of its distillation, such as normal butanol, lends itself advantageously to my process.

What I claim is:

1. The cyclic method of preparing para amino phenol while avoiding the production of an off-grade product, characterized in that para nitro phenol is reduced catalytically with elemental hydrogen in the presence of an inert organic solvent for the amino phenol, after which a crop of amino crystals is recovered from the solvent, and the amino phenol which remains in the mother liquor is subjected along with additional para nitro phenol to a repeated cycle of the catalytic reduction.

2. The method as defined in claim 1 and further characterized in that a substantially non-aqueous solvent is employed and further characterized in that the water resulting from the reaction is removed from the solvent.

3. The method as defined in claim 1 and further characterized in that the solvent employed is one from which the water formed during the reaction may be separated by distillation leaving a substantially anhydrous solution of the residual amino phenol.

JOHANN A. BERTSCH.